(12) United States Patent
Karle

(10) Patent No.: US 8,824,877 B1
(45) Date of Patent: Sep. 2, 2014

(54) SOFTBOX

(71) Applicant: Stefan Karle, Munich (DE)

(72) Inventor: Stefan Karle, Munich (DE)

(*) Notice: Subject to any disclaimer, the term of this patent is extended or adjusted under 35 U.S.C. 154(b) by 0 days.

(21) Appl. No.: 14/214,959

(22) Filed: Mar. 16, 2014

(30) Foreign Application Priority Data

Mar. 18, 2013 (DE) .................. 10 2013 004 665

(51) Int. Cl.
*G03B 15/02* (2006.01)
*F21V 13/02* (2006.01)
*G03B 15/06* (2006.01)

(52) U.S. Cl.
CPC ........................................ *G03B 15/06* (2013.01)
USPC .................................. 396/4; 362/17; 362/343

(58) Field of Classification Search
USPC .................. 396/4; 362/16–18, 278, 320, 343, 362/355–357
See application file for complete search history.

(56) References Cited

U.S. PATENT DOCUMENTS

| 2,201,094 A * | 5/1940 | Kassel .......................... 362/343 |
| 3,946,221 A | 3/1976 | Gandini |
| 4,446,506 A * | 5/1984 | Larson ........................... 362/17 |
| 4,616,293 A | 10/1986 | Baliozian |
| 4,669,031 A | 5/1987 | Regester |
| 4,760,498 A | 7/1988 | Lang et al. |
| 5,023,756 A * | 6/1991 | Regester ........................ 362/16 |
| 5,556,186 A | 9/1996 | Pilby |
| 6,010,234 A | 1/2000 | Rahn |
| 6,076,935 A | 6/2000 | Kester |
| 6,658,342 B1 * | 12/2003 | Hac ................................ 701/70 |
| 6,709,121 B1 | 3/2004 | Lowe et al. |
| 6,733,145 B2 | 5/2004 | Shirilla |
| 7,077,534 B2 | 7/2006 | Harlocker |
| 7,198,388 B2 | 4/2007 | Pilby |
| 7,609,949 B2 | 10/2009 | Ealer |
| 7,963,673 B2 | 6/2011 | Finn |
| 8,014,654 B2 | 9/2011 | Karle |
| 2002/0075666 A1 | 6/2002 | Shirilla et al. |
| 2005/0088836 A1 | 4/2005 | Lowe |
| 2006/0007666 A1 | 1/2006 | Cook |
| 2013/0322051 A1 * | 12/2013 | Ortiz-Gavin .................... 362/11 |

FOREIGN PATENT DOCUMENTS

| DE | 3535293 A1 | 4/1987 |
| DE | 20217782 | 2/2003 |
| DE | 202007009297 | 12/2007 |
| EP | 0917668 B1 | 11/2002 |
| ES | 2244277 A1 | 12/2005 |
| GB | 1456059 | 11/1976 |
| GB | 2425589 | 11/2006 |
| WO | WO0219024 | 3/2002 |
| WO | W02004031849 | 4/2004 |
| WO | WO2005098169 | 10/2005 |
| WO | WO2005103563 | 11/2005 |

* cited by examiner

*Primary Examiner* — W B Perkey
(74) *Attorney, Agent, or Firm* — Hancock Hughey LLP

(57) ABSTRACT

A softbox for being mounted on a light exit of a light source includes support structure extending outwardly and forwardly from the light exit; plural gradually reflective side walls which can be mounted on the support structure; and one or more diffusors arranged between the side walls, wherein the one or more diffusors are, in use, centrally arranged in front of the light exit and inclined in such a manner that a lateral light intensity distribution is more homogeneous at an exit of the softbox, than at an entry of the softbox.

20 Claims, 2 Drawing Sheets

SOFTBOX

CROSS REFERENCE TO RELATED APPLICATIONS

The present invention has been described in German patent application DE 10 2013 004 665.3, submitted on Mar. 18, 2013, at the German Patent and Trademark Office, which application is incorporated herein in its entirety by reference, as if set out herein in full.

TECHNICAL FIELD

The present application relates to a softbox.

BACKGROUND ART

In general, softboxes serve to, on the one hand, direct light emanating from a light exit of a spotlight or the like onto a desired object; and, on the other hand, to illuminate each point on the object from an as large as possible spatial angle sector, in order to avoid deep shadow regions. To this end, a translucent element (diffusor) is arranged at a certain distance in front of the light exit.

Broadly related devices of this kind are known from, e.g., the present inventor's U.S. Pat. No. 8,014,654 B2, incorporated herein by reference. It has been found that the known softbox has an excellent light directing effect, but that in some situations and applications, it is not yet fully satisfying as regards the practicality or its properties.

SUMMARY OF THE INVENTION

The present invention aims at alleviating or obviating the drawbacks of the prior art.

According to a first aspect, the softbox has at least one diffusor arranged between its side walls, centrally in front of the light exit, which at least one diffusor is in use inclined to the light exit in such a manner that a light intensity homogeneity is larger at the exit of the softbox than at its entry. There usually is an annular or part-annular gap between the centrally arranged diffusor and the side walls. The at least one diffusor may include several diffusors, which may be inclined to each other. In this manner, it is achieved that part of light entering the softbox is reflected off the diffusor outwardly towards the side walls, which are partially or wholly reflective, and from there towards the object. This results in the "hot spot" in the center of the outer light exit plane, which is commonly observed with conventional softboxes, i.e. a particularly bright central region surrounded by less bright peripheral regions, is somewhat darkened in favor of a brightening of the peripheral regions. Altogether, this does substantially not happen at the expense of the total light intensity.

The side walls of the softbox are usually neither ideally nor entirely reflective, but only partially or rather gradually so, and also is not ideally diffusively reflective, insomuch as the incident angle of the light corresponds to a main, but not exclusive angle of the reflected light (specular reflection).

It is known that an ideally diffusive reflection would result, for a perpendicularly incident light beam, in an intensity distribution of the reflected light which approximates a cosine angular dependency: maximal at 0° (i.e., perpendicular to the surface of the reflector), approaching zero at 90° (i.e., parallel to the surface, perpendicular to the incident light). Gradual reflectiveness in the sense of this application is meant as indicating an exponent to the cosine, the exponent being substantially larger than 1 but not excessively so, since a very large or even infinite exponent would approximate ideally reflective behaviour (specular reflection). Such gradually reflective behaviour can be achieved by partially (very thinly) metalizing the fabric of the softbox side walls.

In some embodiments, two trapezoidal diffusors, or four triangular ones, are composed to a wedge or pyramid, respectively. The crest of the wedge, or tip of the pyramid, respectively, is directed towards the primary light exit (light entry into the softbox), so that the diffusors are outwardly inclined. The former of these variants is particularly useful for elongated light exit shapes, and among these, particularly if combined with a substantially less elongated softbox. In particular, the modules of so-called "remote phosphor" light sources are typically combined to arrays, the length-to-width ratio of which frequently is much larger than the light exit area of the softbox can be. In such cases, the shorter side walls of the softbox, at the far ends of the light source array, are also much more steeply inclined than the long side walls; and the gradient of the light intensity distribution across the softbox light exit in the transverse direction assumes relatively large values (in terms of magnitude). The "hot spot" in such cases is an elongated area, the borders of which are more prominent in the transverse direction. According to the invention, a diffusor wedge is arranged in the lengthwise direction of the array of light source modules, solving the problem without any substantial loss of light intensity. A substantial homogenisation may also be achieved for quadratic or nearly quadratic, hexagonal or octagonal primary light exit areas, by placing a diffusor pyramid, typically one having the corresponding number of side edges, centrally in front of the light exit, and between the softbox side surfaces, in order to re-distribute the light from the center to the periphery.

Naturally, the side walls of the softbox co-operate in this redistribution. To be able to do so, the side walls are outwardly and forwardly inclined, i.e. they do not merely extend in parallel to the symmetry axis of the softbox. In addition, the diffusor does not extend entirely up to the side walls, as this would ultimately result in undesirable reflection of light towards the light source itself. The side walls may have a degree of concave curvature, aiding in directing the light towards the object.

According to a second aspect, which may be realized together with, or independently of the first aspect, one or more sheaths are provided, which are attachable to the outer ends of the support rods of the softbox. The at least one sheath bears a first component of a releasable connection, such as a Velcro® strip, on its outer face, and at least one second component of the releasable connection (or, in general, a like number) is arranged on an inner circumference of the softbox at its far end, i.e. the end away from the light source. The releasable connection provides for a substantially easier assembling process; in particular, where the support rods are flexible rods intended to be arranged along the inner edges of the softbox in a forwardly bent manner, to be mounted in according holes or receptions of a support ring of the spotlight. This is because, if the support rods are beforehand accommodated in pockets of the softbox, a substantial force is required to bend the support rods. If at least one of the support rods, better still: two or three of them are initially inserted into the holes or receptions on the support ring, and only then the corresponding corner or corners of the softbox are drawn outwards, and the connector components are fixed to one another, the effort is substantially reduced.

According to a third aspect, which again may be realized together with, or independently of the first or second aspect, the softbox has one or more pouches fitting over the outer ends of the support. Each of the pouches is attached on an associated one of the side walls of the softbox, and at least one of the pouches is reversibly releasable from the support. In this manner, the softbox may be easily mounted e.g. on the barn doors of a spot light. This may not be particularly useful with common spot light having hot light sources, because of the prohibitive thermal stress exerted on the softbox; but it is helpful with recent lamps on the basis of remote phosphor technology (i.e., a primary, blue, LED light source and a relatively large-area secondary phosphor panel, being illuminated with the blue light from behind and emitting (almost) white light from the front side. All the pouches may be releasably mounted to the (usually four) barn doors; but it is also possible to permanently attach the smaller side walls of the softbox to the corresponding barn doors (located on the short ends of the light entry), which are usually arranged closer to the light entry upon folding the barn doors inwards. In this variant, the outer, larger barn doors cover the folded softbox in the folded state. When the assembly is unfolded, at first the larger barn doors are put upright; then, the smaller barn doors. Next, the longer side walls are placed near the larger barn doors, and the corresponding pouches manoeuvred over the barn door ends. Lastly, the barn doors are fully extended.

According to a fourth aspect, which again may be realized together with, or independently of the other aspects, the softbox has a frame, which in use is polygonal, and which is adapted to be mounted on the end of the softbox opposite to the light source. The frame serves to stretch the outer light exit face to a rectangle (or, more generally, polygon), where the inherent tension of the softbox does not suffice. This may be the case e.g. where the barn doors mentioned above in conjunction with the third aspect are used, because barn doors are normally inflexible. At the same time, such a frame may help stretching a diffusor arranged within it, and thereby avoid its bulging.

In embodiments, spacers are attached to the frame, which spacers are inclined inwardly-backwardly with respect to the light exit, and which may include grooves, with which the frame is mounted e.g. on the barn doors of an LED spot light. Preferably, the spacers and the barn doors in this case are arranged at an obtuse angle, together approximating a rounded concave shape for the softbox side walls. In this embodiment, the frame increases light exit area of the softbox, increases its depth, and reduces the angle of incidence of the emitted light onto the outer diffusor, thereby further improving on the homogeneity of the emanating light.

In variants, the frame may be mounted releasably, and in this case is preferably foldable; to this end, it may include double tape springs made of steel, slightly bent transversely, and arranged with their concave sides facing. Such double strips maintain a sharp bend quite stably, and may therefore be used to bias the frame outwardly into a rectangular shape. Else, the frame may be permanently connected to the softbox side walls, and together with same constitutes a frusto-pyramidal structure. The frame is mounted, for use, on the not quite extended barn doors, and the side walls are arranged inwards of, and between same, and then the barn doors are fully extended.

In all the variants described above, it is envisaged that the outermost face of the softbox is covered with an outer diffusor layer. This may be dispensable where the inner diffusor is of the angled type. The side walls of the softbox, usually four of them, are substantially light-impermeable.

BRIEF DESCRIPTION OF THE DRAWINGS

In the following drawings.

DETAILED DESCRIPTION OF THE DRAWINGS

Figure 1:
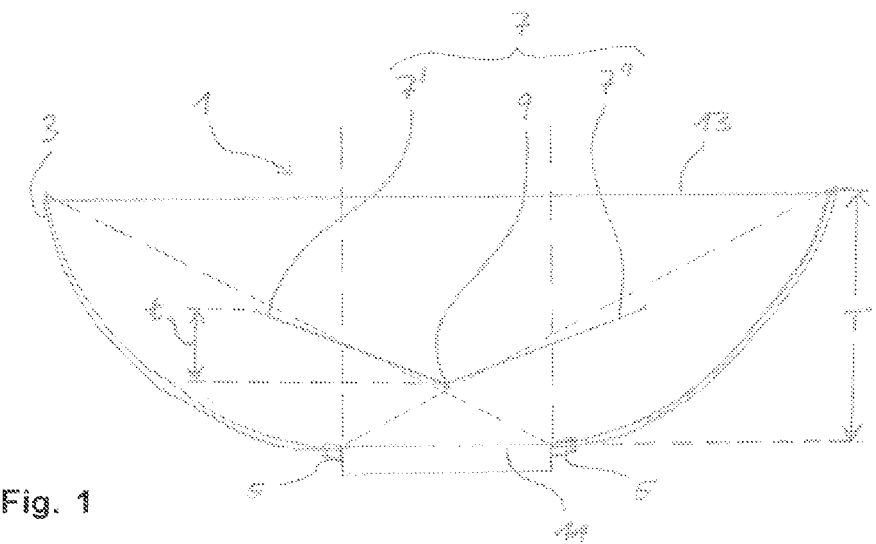
FIG. 1 shows a cross-section of a first embodiment including a wedge- or pyramid-shaped inner diffusor.

FIG. 1 shows, in a schematic cross-sectional view, a softbox 1 with outwardly bent support rods 3, inserted into receptions 5, which receptions are arranged on the light entry side of the softbox 1, the support rods 3 being tensioned by the tensile force of the fabric material of the softbox side walls surrounding them, and vice versa. The depth T of the softbox in an example is 40 cm, and generally may range between 10 cm and 200 cm, depending on the type of spot light. A structure formed of, in this cross-section, two mutually inclined fabric layers 7', 7" is arranged between the side walls, same being tensioned by the support rods 3 which they surround. The diffusor structure is arranged in a central space of the softbox. Depending on whether these fabric layers extend right up to the front and back side walls (invisible in the cross-section), or border on according inclined transverse layers, a wedge or pyramid shape of the diffusor results. The (obtuse-angled) crest 9 of the wedge, or tip 9 of the pyramid, respectively, faces the light entry side. In this example, and typically, the crest or tip 9 is located in that third of the softbox depth located nearest to the light entry 11 to the softbox. The inclined layers 7', 7" are partially light-transmitting, and partially diffusively reflective. That portion of the incident light, which is reflected outwardly, impinges on the metalized, gradually directingly reflective side wall of the softbox. From there, this portion of the light is again reflected, this time towards the object to be illuminated, and primarily through the peripheral regions of the light exit 13 of the softbox. In this manner, the light density distribution on the light exit side 13 of the softbox is made more homogeneous than on the light entry side 11, or than it would be without the inner diffusor 7. In other words, the phenomenon "hot spot" is reduced, and in some instances so efficiently, that an outer diffusor becomes dispensable.

As evident from FIG. 1, the inner diffusor extends sideways beyond the extension of the light exit 11 of the light source, or even beyond a line (shown dashed) connecting the lateral limits of the light exit of the light source and the (opposing) lateral limits of the softbox sidewalls. Thereby, the light source itself is not, or not entirely, directly visible from the object space (without the outer diffusor). A typical depth t of the inner diffusor 7 is one third to two thirds of the depth T of the softbox; the outer edges of the inner diffusor 7 are usually located in the outer third (in the depth direction) of the softbox.

Where the diffusor structure is wedge-shaped, it may readily be fastened to the opposing side walls of the softbox, usually to the smaller ones. This arrangement is particularly simple and efficient in combination with relatively lengthy light exit shapes of the light source, such as those of arrayed LED illuminated remote phosphor modules. Panels of this construction type frequently have an aspect (length/width)

ratio of more than 2. In such cases, conventionally the light density inhomogeneity is particularly pronounced.

With somewhat more effort as regards the required tensioning of the inner diffusor between the inner edges of the softbox, a pyramidal structure can be realized: In one embodiment, fabric trapezoids extending in the light emission direction are mounted between each edge of the pyramid, and the respective inner edge of the softbox, thereby accomplishing the positioning of the pyramid, but additionally contributing to the light directing effect. The outer, longest borders of the trapezoids are slightly curved outwardly to match the curvature of the softbox support rods 3.

Figure 2:
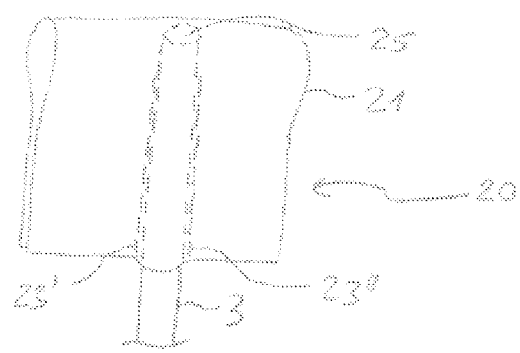
FIG. 2 shows a second embodiment with a hook-and-loop material sheath for a support rod.

FIG. 2 shows a schematic cross-section of a support rod 3 with a sheath 21 formed of a folded hook-and-loop material sheet for the support rod outer end 25. In this example, two seems 23', 23" are formed on either side of the support rod end 25, and through the superimposed halves of the sheet of hook-and-loop material. The skilled person will be aware of alternative manners of providing a cylindrical sheath, e.g. by gluing. Corresponding pieces of the hook-and-loop material are placed (glued or stitched) at or near the outer corners of the softbox, on the inner side thereof. For use, all the support rod ends are placed in the respective receptions near the light source; and (before of after that) one, two or three corners of the softbox are connected with the support rod ends. Next, the last one or two of the softbox corners is/are drawn outwards, and the respective support rod/s is/are bent into the required shape and is/are fixed to the softbox corner by means of the hook-and-loop connection. Conventionally, it was required that the last corner first be connected to the respective support rod, which then had to be forcibly bent to fit into the respective reception.

As will be apparent, it suffices if one or two non-neighboring sheathed support rod ends are present, depending on the circumstances. Naturally, however, all four rod ends 25 may carry such sheaths 20.

Figures 3A, 3B:
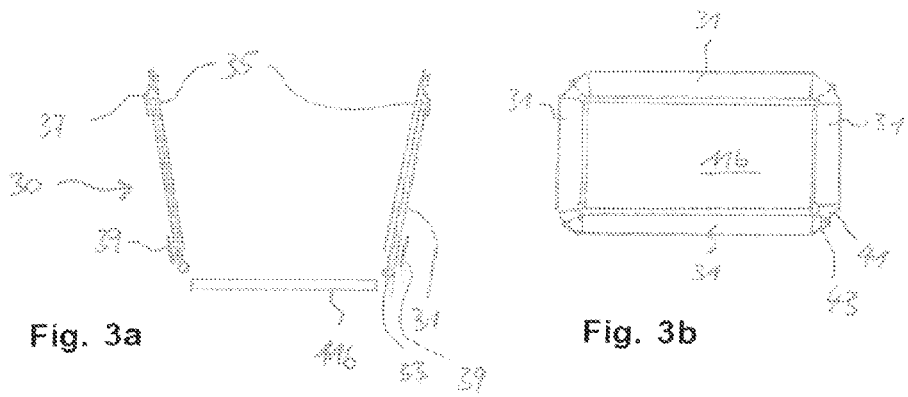
FIGS. 3a,b show a third embodiment with mounting pouches for barn doors, in cross-section and frontal view, respectively.

FIG. 3a shows, in a schematic cross-section, an example of a reflective liner 35 for a light source 11b with barn doors 31, pivotable about axes 33. In this example, the reflective fabric liner 35 is arranged inwards of the support structure, namely the barn doors 35. At the outer rims of this softbox 30, pouches 37 are formed which envelop the outer rims of the barn doors 35. Towards the inner rims, the fabric liners 35 are tensioned by elastic ribbons 39 attached to the inner corners of the softbox. Additionally, there may be tabs (not shown) for fastening the ribbons. In the front view of FIG. 3b, it is discernible that gaps remain between the extended barn doors 35, which gaps are each covered by two trapezoidal or triangular connection pieces 41 of the softbox sidewalls. The connection pieces are sewn 43 together, or are connected in any other way. In this manner, a good light efficiency and light directing property can be achieved, even with light sources 11b of the above type. This is particularly useful because such light sources often have a particularly broad (in terms of spatial angle) light emitting property, and conventionally, a substantial portion of the emitted light is lost by way of absorption at the (usually black) barn doors, and additionally through the gaps between the barn doors.

Figure 4:
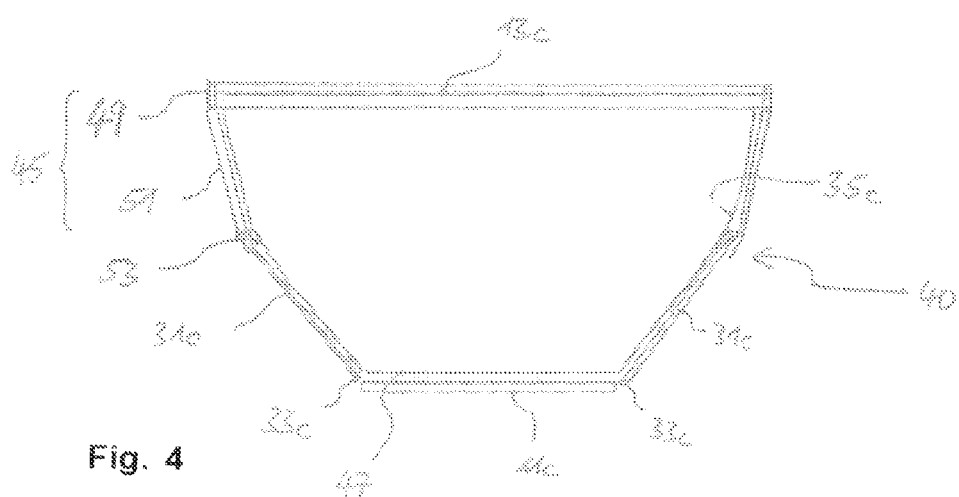
FIG. 4 shows a fourth embodiment with spacers for an up-front tensioning frame.

FIG. 4 shows, in a schematic cross-sectional view, an example of a forward-outward extension 45 for a light source 11c, for providing a larger homogeneous light emitting face 13c even with relatively small barn doors. The inner part is structured similarly as described above in conjunction with FIGS. 3a, 3b, i.e. (usually four) barn doors 31c are arranged around a (primary) light exit face 11c, the barn doors being pivotable around respective pivot axes 33c. At the outer rims of the barn doors 31c, spacers 51 are mounted by means of grooves 53 formed therein, forming an obtuse angle or a 180° angle. At the outer end of the spacers 51, a tensioning frame 49 is connected, which in turn surrounds the outer diffusor layer 13c. On the inner faces of at least the barn doors 31c, the reflective side walls 35c of the softbox 40 are arranged, similarly as described above. A tensioning ribbon is not shown, but may be present. On the other hand, the inner circumference 47 of the light entry of the softbox 40 is shown. It is apparent, that an ideal parabolic shape of the side walls 35c is better approximated by an obtuse angle between the barn doors 35c and the spacers 45, than by a 180° angle; conversely, for a given depth of the softbox, a 180° angle results in an somewhat larger light emitting face 13c.

The skilled person will realize that many alterations and variants are possible to the purely exemplary embodiments described above, without leaving the spirit and scope of the appended claims. E.g., a light source of the remote phosphor type has been described; the softbox is, however, not limited to this technology, but may be combined with light sources of any type except point-like source, such as LED panels, glow lights (neon lamps), OLEDs and the like. Similarly, a tensioning frame including doubled tape springs has been described; however, the structure of the softbox is not so limited, but in some applications, single steel strips may suffice, or a tape spring assembly made of some other material may be employed. Also, the above description mentions pouches for covering entire outer rims of barn doors; whereas in some applications, it suffices if loops or tabs are positioned around the outer corners of the barn doors. Moreover, in the above description, the inner diffusor is described as having either a wedge shape, or a pyramid shape. Naturally, mixed shapes are also possible, such as any kind of roof shapes, e.g. having four inclined portions of pairwise different sizes, and a somewhat shortened crest.

The material for the softbox side walls is not particularly limited, as long as it provides sufficient forward reflexion. Quantitatively, the bidirectional distribution function depending from two angles, namely the incident angle and emitted angle to the normal direction, is difficult to handle, but less so from a measurement point of view than from a theoretical point of view: Assuming a Lambert source to have an angle distribution function of the type proportional to $\cos^{1/1}(\theta)$, a suitable material has an angle distribution function of the type proportional to $\cos^{1/Q}(\theta)$, where Q is a dimensionless index smaller than 1. It is envisioned to set Q in the range 0.1 to 0.9, or in the range 0.2 to 0.5. Herein, $\theta$ designates the angle between the emission direction and the main emitting direction, in the approximation of perpendicular incidence. Where the incidence is strongly inclined, the above approximation becomes less accurate, if only because the emission characteristic becomes asymmetric.

In particular, the above described variant may be combined with each other, so that the advantages achieved therewith not only add up, but interact synergistically. On the other hand, not all of the advantages described above need be achieved with each and every embodiment of the invention.

The invention claimed is:

1. A softbox for being mounted on a light exit of a light source, the softbox comprising:
   support structure extending outwardly and forwardly from the light exit;
   plural gradually reflective side walls which can be mounted on the support structure; and
   one or more diffusors arranged between the side walls;
   wherein the one or more diffusors are, in use, centrally arranged in front of the light exit and inclined in such a manner that a lateral light intensity distribution is more homogeneous at an exit of the softbox, than at an entry of the softbox.

2. The softbox of claim 1, wherein the one or more diffusors include plural diffusors arranged in succession or side-by-side.

3. The softbox of claim 1, wherein the one or more diffusors include plural diffusors inclined to each other.

4. The softbox of claim 1, wherein two or more trapezoidals or triangles are arranged to a wedge shape or a pyramid shape, respectively, to constitute the diffusor, wherein a crest of the wedge shape, or a tip of the pyramid shape, respectively, points towards the light exit, the trapezoidals or triangles, respectively, optionally being connected to inner edges between the sidewalls.

5. The softbox of claim 1, further including one or more sheaths mountable onto outer ends of the support structure, the one or more sheaths each having, on an outer side, a first component of a releasable connection, one or more second components of the releasable connection being arranged at an inner circumference of the exit of the softbox.

6. A softbox for being mounted on a light exit of a light source, the softbox comprising:
support structure extending outwardly and forwardly from the light exit;
plural gradually reflective side walls which can be mounted on the support structure; and
one or more diffusors arranged between the side walls;
further including one or more sheaths mountable onto outer ends of the support structure, the one or more sheaths each having, on an outer side, a first component of a releasable connection, one or more second components of the releasable connection being arranged at an inner circumference of the exit of the softbox.

7. The softbox of claim 6, including one or more pouches fitting over outer ends of the support structure, wherein each of the one or more pouches is attached to an associated one of the side walls, and at least one of the one or more pouches is releasable from the support structure.

8. The softbox of claim 7, including at least two elongated pouches adapted in size so as to fit over barn doors of a spot light.

9. The softbox of claim 8, wherein the spot light is of a remote phosphor type.

10. A softbox for being mounted on a light exit of a light source, the softbox comprising:
support structure extending outwardly and forwardly from the light exit;
plural gradually reflective side walls which can be mounted on the support structure; and
one or more diffusors arranged between the side walls;
including one or more pouches fitting over outer ends of the support structure, wherein each of the one or more pouches is attached to an associated one of the side walls, and at least one of the one or more pouches is releasable from the support structure.

11. The softbox of claim 10, including at least two elongated pouches adapted in size so as to fit over barn doors of a spot light.

12. The softbox of claim 11, wherein the spot light is of a remote phosphor type.

13. The softbox of claim 1, including an, in use, polygonal frame for being mounted on an inner circumference at the far end of the softbox as seen from the light exit of the light source.

14. The softbox of claim 13, the frame including at least two spacers each for mounting, at a predetermined angle and beyond the support structure, the frame to an associated component of the support structure.

15. The softbox of claim 13, wherein the frame is foldable.

16. The softbox of claim 13, wherein the frame is reversibly attachable to the side walls.

17. The softbox of claim 13, wherein the frame is permanently attached to the side walls.

18. The softbox of claim 1, wherein a translucent layer is tensioned between the outer corners of the softbox, as seen from the light exit of the light source, as an outer diffusor.

19. The softbox of claim 6, wherein a translucent layer is tensioned between the outer corners of the softbox, as seen from the light exit of the light source, as an outer diffusor.

20. The softbox of claim 10, wherein a translucent layer is tensioned between the outer corners of the softbox, as seen from the light exit of the light source, as an outer diffusor.

* * * * *